Aug. 17, 1954          C. G. HÅRD AF SEGERSTAD          2,686,532
            BALANCED PRESSURE AND VACUUM REGULATOR
                      Filed Jan. 25, 1949
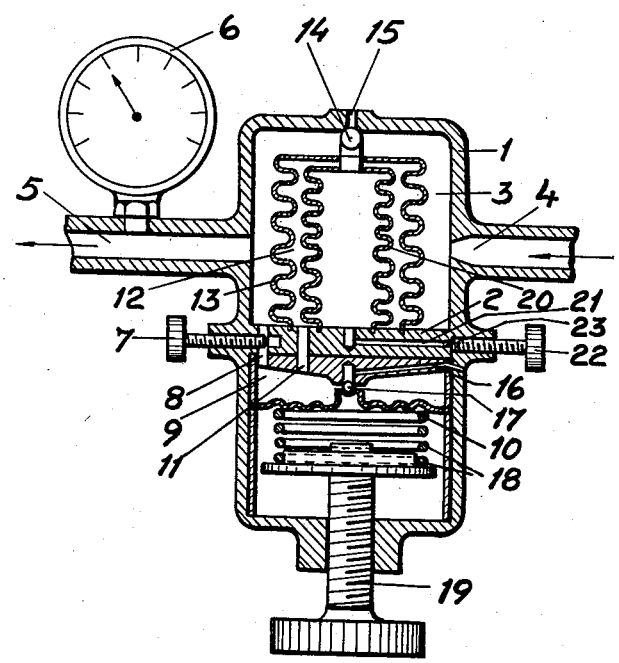
Inventor:
Carl Gustaf Hård af Segerstad,
By: Pierce, Scheffler & Parker,
    Attorneys.

UNITED STATES PATENT OFFICE 2,686,532

BALANCED PRESSURE AND VACUUM REGULATOR

Carl Gustaf Hård af Segerstad,
Sandviken, Sweden

Application January 25, 1949, Serial No. 72,592

Claims priority, application Sweden
January 29, 1948

1 Claim. (Cl. 137—500)

The present invention relates to a balanced pressure or vacuum regulator, comprising a chamber, the pressure in which is controlled by a pressure control valve, characterised thereby, that the said pressure control valve is actuated by a flexible member and by the difference between the pressure in the said chamber, which pressure is controlled by the said valve, and the pressure in a second chamber, which through constricted channels communicates with the first mentioned chamber and with the surrounding atmosphere. Due to the fact that the valve member according to the invention is actuated not only by the controlled pressure but also by a pressure, which to a great extent counterbalances the same, the advantage is obtained that strong springs are not necessary for balancing the same, whereby an increased sensitivity is obtained.

The accompanying drawing is a view in vertical central section of one form of valve construction embodying the invention.

1 is a casing, the interior of which is divided into two compartments by means of a partition 2. The upper compartment or chamber 3 is connected with a pressure fluid source, not shown, by means of a constricted inlet tube 4 the said compartment 3 being also provided with an outlet tube 5, to which there is connected a manometer 6. In the partition 2 there is provided a constricted opening or channel 8, controlled by means of a screw 7, which opening connects the chamber 3 with the chamber 9 situated under the partition 2 and limited downwards by means of a membrane 10, the said chamber 9 communicating through an opening 11 in the partition 2 with the interior 12 of a membrane 13, which is arranged within the chamber 3 and has the form of a bellows and which preferably consists of a metallic material. The membrane 13 is tightly connected at its bottom with the partition 2 and carries at its top a ball valve 14, serving the purpose of throttling a leak opening 15. In the partition 2 there is a leak channel 16, which is controlled by a ball valve 17 carried by the membrane 10. The membrane 10 is actuated from below by a spring 18, whose pressure is controlled by a screw 19, which thus serves to adjust the pressure in the chamber 9 and thereby also the pressure in the pressure tube 5 and which if desired may be provided with an indicator, showing on a scale the said pressure in the tube 5. Within the bellows 13 there is provided another similar bellows 20, which is mechanically connected at its top with the bellows 13 and whose interior communicates at the bottom with the surrounding atmosphere through the intermediate of a channel 21, which is adjustably throttled by means of a screw 22, controlling the area of a part of the channel 21, which part is directed at right angles to the plane of the drawing. The bellows 20 serves to damp the process of regulation at rapid pressure variations. This purpose may also be obtained by omitting the bellows 20 and the channel 21 and in stead thereof making the channel 11 narrow, in which case a screw, corresponding to the screw 22, may be arranged for adjusting the area of the channel 11.

Due to the fact that the constant pressure in the chamber 9, which is adjusted by the screw 19 and which is a certain proportion of the pressure in the chamber 3 and is equal thereto, minus the pressure drop in the throttle point 8, is transferred via 11 to the chamber 12 in the bellows 13, this pressure will counterbalance a certain part, preferably the greatest part, of the pressure existing in the chamber 3 and acting upon the bellows 13. Thus the spring force of the bellows need not take up the whole pressure in the chamber 3 but only the portion thereof, which corresponds to the pressure drop in the throttle point 8. The utilization of a fluid of constant pressure for balancing a great part of the pressure in the chamber 3 brings about the advantage that the regulation becomes more exact and that the device becomes more sensitive than if strong springs were used for actuating the valve 14. The quantity of fluid flowing out through the channels 8 and 16 may be adjusted by means of the screw 7, as may also, to a certain extent, the speed of regulation.

The constructional form shown on the drawing is only shown as an example and may be modified in many details without departing from the idea of the invention. For instance, the setting device 18, 19 may be arranged for actuating the constricted passage 8 and the screw 7 may be arranged to actuate the leak 16. The screw 7, as well as the spring 18, is not absolutely necessary. If the spring 18 is omitted, so that the screw 19 operates the valve 17 directly, the pressure in the chamber 9 becomes a certain proportion of the constant pressure in chamber 3, the said proportion being determined by the inlet and outlet areas of the chamber 9. The principles of the invention may also be incorporated in a vacuum regulator valve structure.

I claim:

In a device for regulating fluid pressure, a valve housing including a first chamber, a fluid inlet to and a fluid outlet from said chamber, a first valve for controlling the fluid pressure in said chamber, a first bellows in said chamber connected with said valve for actuating the same, a second bellows disposed within said first bellows and connected therewith to provide a damping action for said valve, a channel connecting the interior of said second bellows with the atmosphere, an adjustable throttling device connected with said channel for controlling the amount of damping action provided by said second bellows, a second chamber in said valve housing, a passageway connecting said second chamber with the interior of said first bellows, a second channel interconnecting said first and second chambers, a second adjustable throttling device connected with said second channel for controlling fluid flow between said first and second chambers, a third channel leading from said second chamber to atmosphere, a second valve controlling fluid flow into said third channel, and a spring loaded diaphragm connected with said second valve for actuating the same, said diaphragm also constituting a portion of the wall of said second chamber.

References Cited in the file of this patent

UNITED STATES PATENTS

| Number | Name | Date |
|---|---|---|
| 120,958 | Garland | Nov. 14, 1871 |
| 1,690,097 | Ackermann | Nov. 6, 1928 |
| 1,916,635 | Pepper | July 4, 1933 |
| 2,043,453 | Vickers | June 9, 1936 |
| 2,047,101 | Grove | July 7, 1936 |
| 2,117,800 | Harrison | May 17, 1938 |
| 2,351,871 | Parker | June 20, 1944 |
| 2,521,264 | Stark | Sept. 5, 1950 |